United States Patent [19]

Patel

[11] Patent Number: 4,497,398
[45] Date of Patent: Feb. 5, 1985

[54] FLUID OPERATED CLUTCH OR BRAKE

[75] Inventor: Kiritkumar R. Patel, North Royalton, Ohio

[73] Assignee: Eaton Corporation, Cleveland, Ohio

[21] Appl. No.: 433,333

[22] Filed: Oct. 7, 1982

[51] Int. Cl.³ .................. F16D 25/04; F16D 49/14
[52] U.S. Cl. ................... 192/88 B; 188/366; 192/76; 192/79; 192/85 AT
[58] Field of Search ............ 192/88 B, 85 AT, 76, 192/77, 79; 188/365, 366; 92/90, 93, 105

[56] References Cited

U.S. PATENT DOCUMENTS

| | | | |
|---|---|---|---|
| 1,899,299 | 2/1933 | Abercrombie et al. | 92/90 |
| 2,251,445 | 8/1941 | Fawick | 192/88 B |
| 2,422,227 | 6/1947 | Fawick | 192/88 B X |
| 2,605,863 | 8/1952 | Talboys et al. | 192/88 B X |
| 2,606,792 | 8/1952 | Marsh | 192/85 AT X |
| 2,673,573 | 3/1954 | Fawick | 188/366 X |
| 2,765,061 | 10/1956 | Fawick | 188/366 X |
| 2,870,891 | 1/1959 | Eakin et al. | 192/88 B |
| 3,075,624 | 1/1963 | Fawick | 192/88 B |
| 3,173,527 | 3/1965 | Eakin | 192/88 B |

Primary Examiner—Rodney H. Bonck
Attorney, Agent, or Firm—C. H. Grace; C. J. Toddy

[57] ABSTRACT

A brake or clutch having two relatively rotatable members and a hollow fluid-distensible resilient annular tube frictionally engaging one of the members. The tube is split and the ends butted together. And at the butt ends of the tube means are provided for increasing the durability and life of the tube.

4 Claims, 6 Drawing Figures

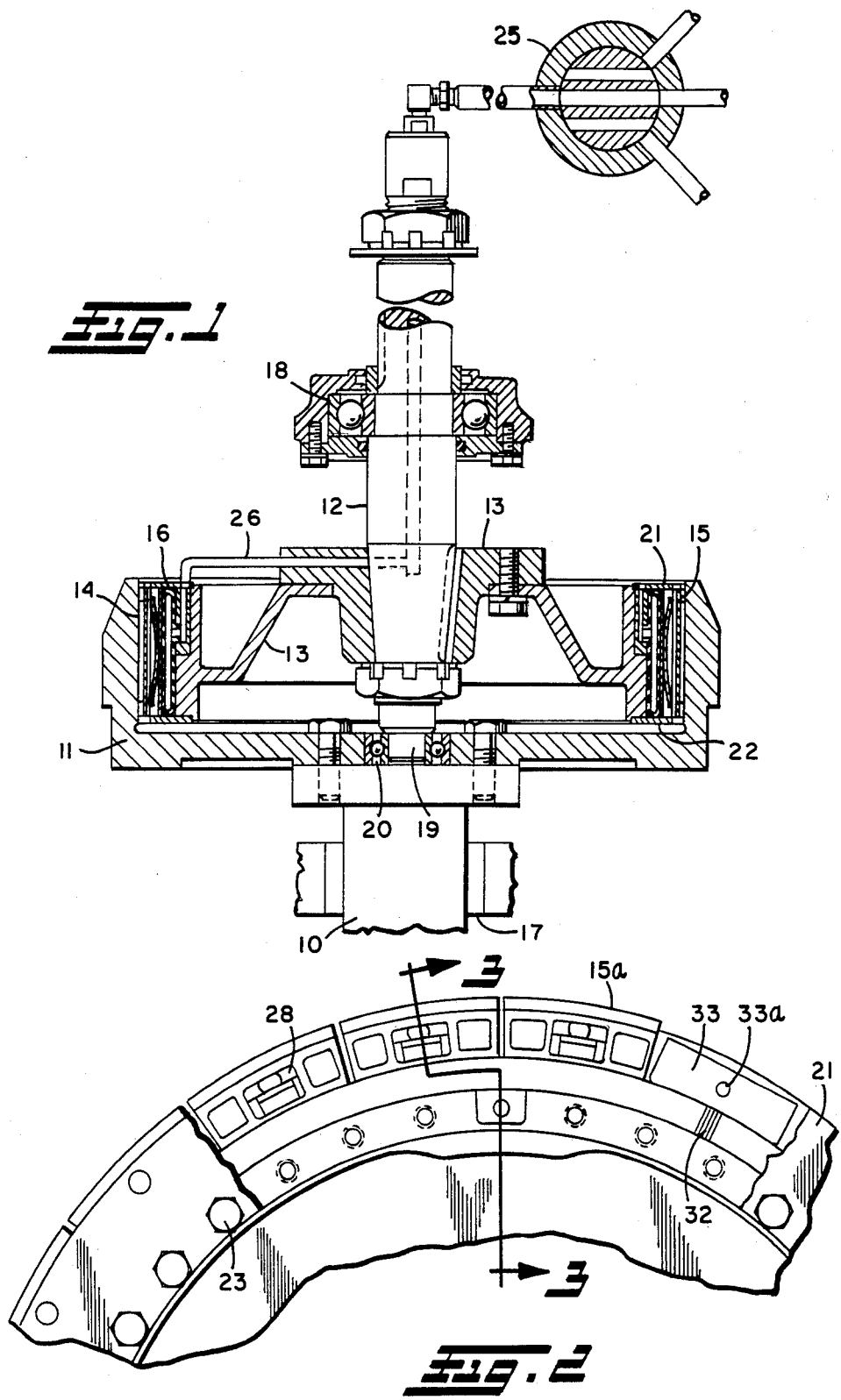

FLUID OPERATED CLUTCH OR BRAKE

This invention relates to friction torque transmitting devices of the inflatable annulus type. More particularly, this invention relates to devices such as couplings, brakes and clutches having an inflatable annulus disposed between concentrically arranged rotable members, the annulus being adapted for expansion or contraction in establishing and interrupting the driving connection between the parts.

U.S. Pat. No. 2,251,445 discloses a typical mounting arrangement for the rotatable members with shafts for supporting the members for rotation mounted upon bearings and the like. This arrangement necessitates disassembly of the clutch or brake when it is desired to replace or repair the inflatable annulus or tube. For this reason, it is desirable to construct the inflatable tube with a transverse split so that the tube may be readily removed from the assembly by "snaking" one end of the tube around or through obstructions of the mounting arrangement. Unfortunately, the split ends of the tube are a source of early failure of the tube.

It is, therefore, a principal object of the present invention to provide an improved torque transmitting device of the inflatable split tube type in which means are provided for increasing the durability and life of the tube.

Another object of this invention is to provide a torque transmitting inflatable tube which is split transversely and which can be either mounted on an internal member of a clutch or coupling assembly for expansion against the outer member of the assembly to establish a driving connection, or mounted on the outer member of a clutch or coupling for contraction against the inner member to establish a driving connection.

A further object of this invention is to provide a torque transmitting inflatable tube which is split transversely and can be used in either an expanding or contracting type of clutch or brake of simple design, economy of manufacture and ease of repair and replacement.

IN THE DRAWINGS

FIG. 1 is an axial sectional view with parts broken away and in cross-section of a clutch or brake embodying this invention;

FIG. 2 is a fragmentary side elevational view of a clutch or brake of this invention having an inflatable tube that expands radially outward;

Figure 3:
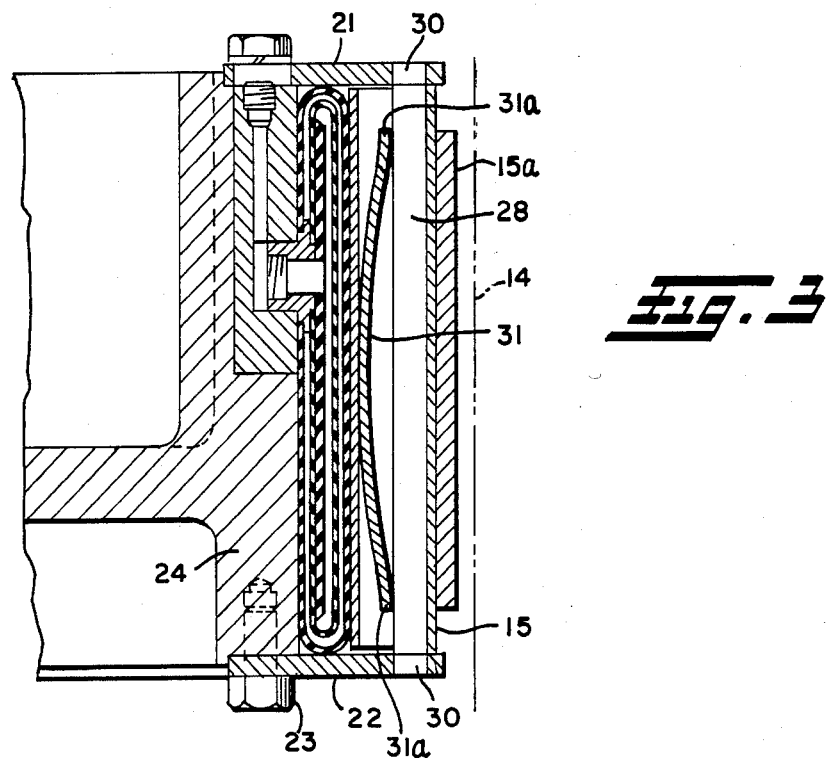
FIG. 3 is a fragmentary sectional detail with parts broken away and removed, taken along lines 3—3 of FIG. 2.
Figure 4:
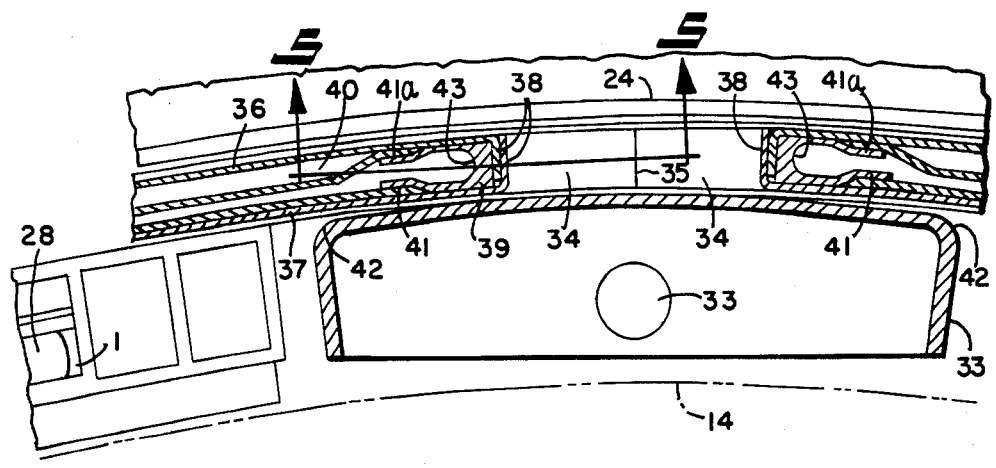
FIG. 4 is a fragmentary sectional detail similar to FIG. 2 of an inflatable tube that contracts radially inwardly.
Figure 6:
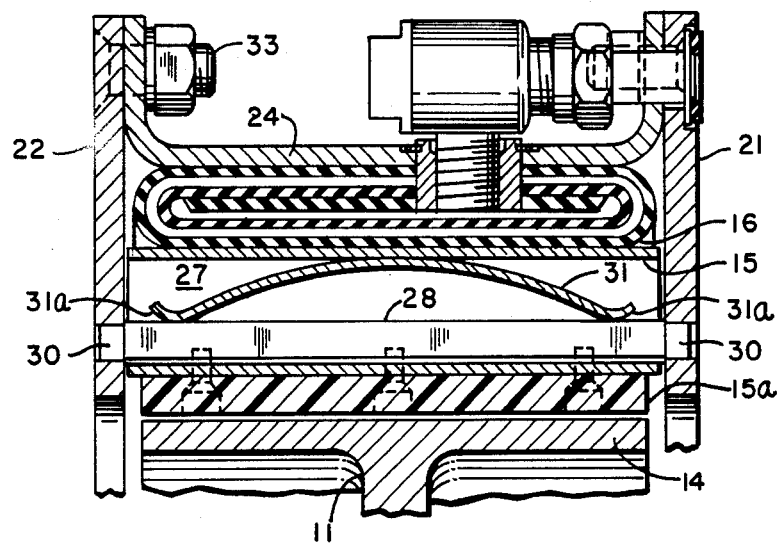
FIG. 6 is a sectional view similar to FIG. 3 showing a tube contracting radially inwardly.

The brake or clutch shown in the drawings is designed for use as a clutch or brake of the constricting type or of the expanding type. FIGS. 1 through 3 of the drawings show a brake or clutch construction of the expanding type and FIGS. 4 and 6 shows a brake or clutch of the constricting type.

The embodiment shown in FIGS. 1 through 3 comprises a drive shaft 10 having a bell shaped flywheel 11 secured thereon and a driven shaft 12 having secured upon it a clutch hub 13. The flywheel 11 has a cylindrical inner surface 14 adapted to be engaged by a circumferential series of clutch blocks or wear shoes 15 which are mounted upon a torque-transmitting tube 16.

The drive shaft 10 is supported by one or more bearings 17 axially outboard of the fly wheel 11 and the driven shaft 12 is supported by one or more bearings 18 axially outboard of the hub 13. The inboard end of the driven shaft 12 is provided with a stub shaft 19 supported in a bearing 20 housed in the fly wheel 11.

The expanding structure comprises a pair of axially spaced apart side rings 21, 22 connected by bolts 23 to the cylindrical tube supporting ring 24. The tube 16 is a fluid-distensible annular shaped tube provided with an inlet and control valve 25 as shown in FIG. 1 for connecting tube 16 to a source of pressure fluid via pipe 26 and to release it from the tube 16 through the pipe 26 while the tube 16 is rotating as will be readily understood by those skilled in the art.

The set of wear shoes 15 are each provided with a friction facing 15a adapted to be forced into engagement with the drum 14 by outward distention of the tube 16 away from the axis of rotation, and to be withdrawn inwardly from the drum. The shoes 15 are mounted on the ring 24 between the side rings 21 and 22 as shown in FIG. 3. Each shoe 15 is formed midway of its length with a driving interlock hole or "tunnel" 27 of rectangular cross sectional shape in which is mounted a torque-sustaining bar 28 having a rectangular cross sectional shape. The bar 28 is in torque sustaining contact with the side walls 29 of the hole 27. At each end of the bar 28, a cylindrical projection 30 is fitted in a hole formed in the adjacent side rings 21, 22. A leaf spring 31 having its ends 31a seated upon the radially inner face of the bar and its middle part bearing against the radially inner wall of the hole 27 for constantly but yieldingly urging the shoe 15 away from the drum 14, but permitting the tube 16 to move the shoe 15 radially outwardly against the bias of spring 31 into contact with the drum 14 upon inflation of the tube 16.

FIG. 6 of the drawings illustrates a contracting type of clutch or brake as shown in U.S. Pat. No. 2,870,891 granted Jan. 27, 1959 to J. V. Eakin and J. S. Walsh, in which the shoe 15 is contracted radially inwardly by the tube 16 into engagement with the cylindrical outer surface 14 of the wheel 11. The friction facing 15a is riveted or otherwise secured to the shoe 15 having a hole or tunnel 27 of rectangular cross sectional shape in which is mounted a torque sustaining bar 28 of cross sectional rectangular shape. At each end of the bar 28 a cylindrical projection 30 is fitted in a hole formed in the adjacent side rings 21 and 22. A leaf spring 31 having its ends 31a seated upon the radially outer face of the bar and its middle part bearing against the radially outer end of the hole 27 for constantly but yieldingly urging the shoe 15 away from the cylindrical surface 14, but permitting the wear shoe 15 to move radially inwardly into contact with the surface 14 upon inflation of the tube 16.

Since it would be extremely difficult to remove an annular tube from the assembly, the tube 16 is split transversely across the width of the tube 16 as at 32 shown in FIG. 2 of the drawings. Across the split ends 32 of the tube a restraining member 33 is substituted in place of a wear shoe 15. The retaining member 33 is held in place by a bolt passing through holes 33a in the flanges of the restraining member and through holes in the side rings 21, 22. After the restraining member is removed, the tube 16 may be "snaked" from the assembly for replacement purposes without disassembling either the drive shaft 10 and its attendant bearings or the driven shaft 12 and its attendant bearings. In accordance with this invention the split ends 32 of the tube 16 are constructed in a manner and coact with the restraining device so as to maximize the durability of the tube 16 at the ends 32.

FIG. 4 of the drawing shows a transverse sectional view across the split ends of the tubes 16 and the restraining member 33 with parts broken away and in cross section. The particular view is taken across the split ends of the tube 16 of a contracting type clutch or brake as shown in FIG. 6 with the wear shoes 15 movable radially inwardly into contact with surface 14 of the flywheel. The restraining member 33 extends across the split ends of the tube from one edge to the other and circumferentially thereof for a substantial distance terminating in shoulder 42.

A block of rubber-like material 34 extends transversely across the complete width of each of the ends 32 of the tube 16 forming a face 35 at the midpoint of the restraining device 33. The blocks 34 are rectangular in cross section and have a length circumferentially of the tube 16 preferably greater than the radial thickness thereof. The tube 16 is formed of elastomeric material reinforced with cord plys 36, 37. The ends 38 of the plies are turned radially around a boot 39. A layer of rubber 40 is positioned radially inward of the ply 36 adjacent the ring 24.

Figure 5:
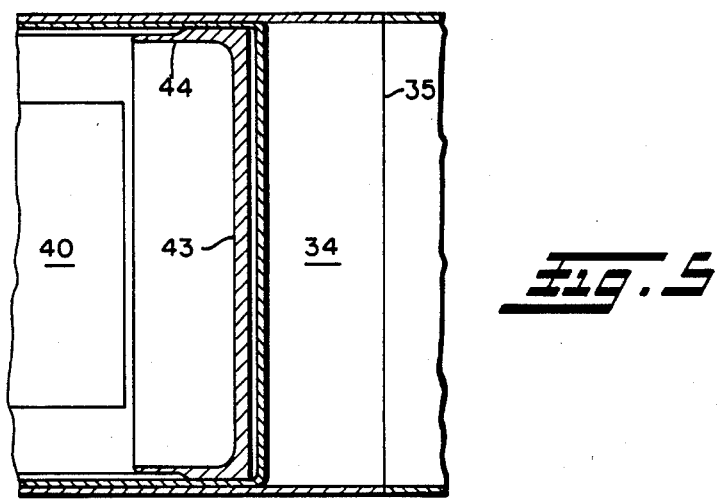
FIG. 5 is a sectional view taken along the lines 5—5 of FIG. 4.

As shown in FIGS. 4 and 5 of the drawings, the boot 39 is substantially U-shaped in cross section with the closed end of the "U" facing the rubber block 34 and with the legs 41, 41a at the open end of the boot facing away from the block 34. The legs 41, 41a terminate short of the shoulder 42 of the restraining member 33. The circumferential dimension of the boot 39 is approximately equal to the circumferential dimension of the block 34. Furthermore, the legs 41, 41a of the boot 39 are separated from each other by a distance equal to approximately one-half the thickness of the block 34. The base 43 of the boot is formed with a large radius of curvature equal to approximately one-fourth of the thickness of the block 34.

As previously indicated the boot 39 extends across substantially the complete width of the tube 16, as shown in FIG. 5 of the drawings, and the lateral walls 44 of the boot 39 are formed with a radius of curvature substantially the same dimension as the radius of curvature of the base 43 of the boot.

The blocks 34 provide rigidity across the complete width of the tube 16 and minimizes deflection of the tube at the split ends thereof. Although the circumferential length of the blocks 34 are preferably greater than the radial thickness, the circumferential length should, at a minimum, be larger than the radial thickness of boot 39. Since the restraining device 33 extends across the complete width of the tube 16 and also extends circumferentially of the tube beyond the legs 41, 41a of the boot 39 it is seen that very little stress is applied to the ply endings or to the boot when the tube is inflated to move the wear shoes inwardly into engagement with the face 14 of the fly wheel 11 as shown in FIG. 5. Also, the large and smooth shoulder 42 of the restraining member has a radius of curvature at least as large as the radius of curvature of the base 43 of the boot 39 and preferably up to two times the radius. Thus, the tube 16 bridges the gap between the shoulder 42 and the adjacent shoe 15 smoothly and prevents significant abrasion and concentration of forces as the tube 16 adjacent the shoulder 42 is expanded and retracted.

I claim:

1. A brake or clutch comprising:

two relatively rotatable structures adapted for torque-sustaining frictional engagement with each other and arranged one radially inside the other, one of said structures comprising a hollow fluid-distensible resilient annular tube having an annular torque-sustaining wall of cord reinforced rubber-like material which is positioned to be forced radially toward the other of said structures by internal fluid pressure in the tube, said tube being split tranversely to form abutting walls both formed by a block of rubber-like material, a U-shaped boot positioned adjacent each block with the open end facing away from said abutting walls and cord reinforced plies ends folded around the closed end of said boot, and a restraining member extending across the juncture of said abutting walls and circumferentially of said tube substantially beyond the ends of said boot to thereby limit the flexing of the boot.

2. A brake or clutch as claimed in claim 1 in which a base of said boot has a radius of curvature approximately one-fourth the dimension of the thickness of said block.

3. A brake or clutch as claimed in claims 1 or 2 in which each block of rubber-like material has a greater dimension circumferentially of the tube than the radial thickness of the boot.

4. A brake or clutch as claimed in claims 1 or 2, in which said restraining member terminates in shoulders at the circumferential ends thereof, said shoulders having curvature which is between one and two times the radius of curvature of the base of the boot.

* * * * *